April 22, 1952
C. S. LYNCH
2,593,584
REFORMING HYDROCARBON GASES IN THE
PRESENCE OF A MAGNESIA CATALYST
Filed Dec. 1, 1948
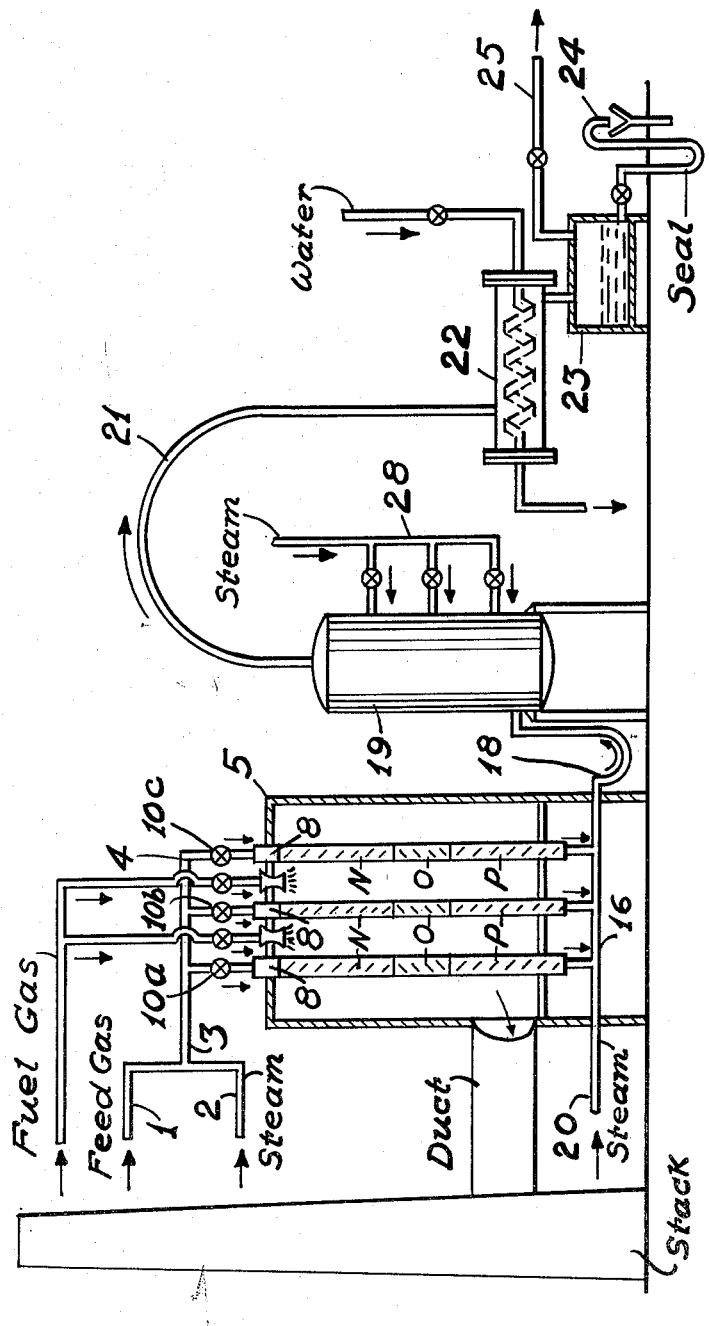
Charles S. Lynch Inventor
By J. Cashman Attorney Patented Apr. 22, 1952

2,593,584

UNITED STATES PATENT OFFICE 2,593,584

REFORMING HYDROCARBON GASES IN THE PRESENCE OF A MAGNESIA CATALYST

Charles S. Lynch., Plainfield, N. J., assignor to Standard Oil Development Company, a corporation of Delaware Application December 1, 1948, Serial No. 62,838

11 Claims. (Cl. 252—373)

The present invention relates to an improved process for producing gas mixtures containing CO and $H_2$ from hydrocarbon gases by a reforming reaction with $CO_2$ or steam and $CO_2$ in the presence of a suitable reformation catalyst. More specifically, the invention relates to a method for preventing coke formation on the catalyst of this process, particularly when used for the production of gas mixtures suitable as feed gases for the catalytic synthesis of normally liquid hydrocarbons and other valuable products from CO and $H_2$.

The present invention will be fully understood from the following description read with reference to the accompanying drawing which is a flow plan indicating the manner in which conventional apparatus may be adapted to the purposes of the invention.

In recent years it has become desirable to manufacture gas mixtures containing various proportions of CO and $H_2$, in large volumes to supply the needs of the rapidly developing synthetic oil production from CO and $H_2$.

The hydrocarbon synthesis requires feed gas mixtures having an $H_2$:CO ratio of about 0.5–3. It has long been known that gas mixtures containing $H_2$ and CO in these proportions may be produced from hydrocarbon gases such as methane, ethane, propane, or gaseous olefins in the form of natural gas, refinery gas, or other readily available hydrocarbon gas mixtures, by a conversion with steam and $CO_2$ in varying proportions at temperatures of about 900°–1700° F. on a relatively long and narrow externally heated column of suitable reformation catalysts, such as an iron group metal, particularly nickel associated with difficulty reducible oxides, such as magnesia, silica, and/or alumina, according to the following reactions:

$$CH_4 + H_2O \rightleftharpoons CO + 3H_2 \quad (1)$$
$$CH_4 + CO_2 \rightleftharpoons 2CO + 2H_2 \quad (2)$$
$$CO + H_2O \rightleftharpoons CO_2 + H_2 \quad (3)$$

The above equations show that the $H_2$:CO ratio of the product gas may be increased by increasing the steam content in the feed so as to shift equilibrium reaction (1) and/or reaction 3 to the right. An increase of the $CO_2$ content of the feed will increase the CO content of the product gas in accordance with reactions (2) and (3). Theoretically, therefore, gas mixtures containing CO and $H_2$ in any desirable synthesis feed gas ratio may be produced merely by determining the $H_2O$:$CO_2$ feed gas ratio most favorable to the production of CO and $H_2$ in the desired ratio and contacting a feed gas having this favorable ratio with methane or the like at suitable temperatures on the catalysts mentioned above.

In practice, however, a serious difficulty can arise from the formation of carbon which de- activates the catalyst, increases pressure drop and impedes the heat supply to the strongly endothermic reaction, resulting in frequent interruptions of the process. This carbon formation is due chiefly to a combination of the following reactions:

$$2CO = CO_2 + C \quad (4)$$
$$CH_4 = 2H_2 + C \quad (5)$$

Carbon formation may be suppressed by an increase of the $H_2O$ concentration in the feed whereby reactions (1) and (3) are favored to proceed from left to right with the effect that CO and $CH_4$ will form $H_2$ and carbon oxide rather than carbon in accordance with reactions (4) and (5). The use of excess steam actually is an effective means of suppressing carbon formation, which has been long practiced in the conventional catalytic reformation of methane with steam alone. However, the application of this means to the production of synthesis feed gas of a desired $H_2$:CO ratio has the obvious drawback that any increase in the steam concentration will result in a corresponding increase in the $H_2$:CO ratio of the product gas in accordance with equations (1) and (3). It follows that whenever the steam concentration is increased to prevent carbon formation, a corresponding amount of $CO_2$ must be added to promote reaction (3) in the direction from the right to the left.

It should be understood that this presentation of the reaction mechanism is a simplification of the actual conversion mechanism, particularly in view of the fact that the rate and extent of the individual reactions mentioned are highly temperature sensitive. Therefore, in order to prevent carbon formation, the $H_2O$:$CO_2$ ratio in the feed gas must be correlated with the temperature.

These conditions result in the requirement of a large excess of steam and $CO_2$ in the reaction zone. On the other hand, the use of such a large excess of reactants substantially increases the cost of utilities and $CO_2$ removal from the product gas and the amount of sensible heat required for the process. In practice it is difficult, therefore, to produce gas mixtures containing $H_2$ and CO in a ratio as low as or lower than 1. These difficulties are particularly pronounced whenever the feed stock contains substantial proportions of constituents such as paraffinic gases containing more than one carbon atom per molecule or gaseous olefins which have a strong tendency to crack and deposit carbon at methane conversion conditions.

For these reasons it has been suggested heretofore to convert the feed stock in stages by contacting it first with a catalyst having a relatively high conversion but low cracking activity for olefins and higher molecular weight paraffinic gases and a low conversion activity for methane so as first to convert the constituents which are the strongest carbon formers at relatively mild conditions into $H_2$ and CO, and thereafter contacting the effluent of this treatment with a catalyst of highest conversion activity for methane at suitable methane conversion conditions but now in the substantial absence of constituents which form excessive amounts of carbon at these conditions. The catalysts used for this purpose are usually the composites described above. The conversion activity of these catalysts is controlled by varying the nickel content of the composite within the approximate limits of 8-30% (calculated as NiO). Catalysts of relatively low nickel concentration being used in the early stages of the process and those of high nickel concentrations in the later stages. However, even this type of operation has encountered difficulties resulting from carbon formation, particularly when it was attempted to use predominantly $CO_2$ as the oxidizing agent in the production of gas mixtures containing $H_2$ and CO in relatively low ratios.

The present invention overcomes these difficulties and affords various additional advantages as will appear from the following detailed description of the invention.

It is, therefore, the principal object of the present invention to provide improved means for producing gas mixtures rich in $H_2$ and CO by the catalytic conversion of hydrocarbon gases with a mild oxidizing agent such as $CO_2$ or mixtures of $CO_2$ and steam.

A more specific object of the invention is to provide means for reducing or eliminating catalyst coking in a process of the type specified.

Other objects and advantages will appear hereinafter.

The present invention is based on the surprising discovery that hydrocarbon gases may be converted with $CO_2$ into gas mixtures containing $H_2$ and CO in the presence of a catalyst consisting exclusively of magnesia and that no carbon is formed in this conversion. Accordingly the invention in its broadest aspect resides in passing a mixture of hydrocarbon gases with an oxidizing gas containing substantial proportions of $CO_2$ over a catalyst consisting of magnesia at conversion conditions of temperature, pressure and contact time suitable for the production of substantial amounts of $H_2$ and CO. The invention finds its most useful application in connection with feed stocks containing substantial proportions of constituents having strong cracking tendencies, such as ethane, propane, ethylene and propylene.

The absence from the catalyst of the conventional iron group metals results in a reduction of catalyst activity, i. e. in the percent conversion of hydrocarbons per pass. However, it has been found that hydrocarbon conversions exceeding 60% and even approaching 70% may be readily obtained in single pass operation, even with methane as the feed, without any carbon formation when using magnesia alone as the catalyst. Substantially higher conversions of, say, about 70-90% may be obtained when using more reactive feed materials, such as olefins or saturated hydrocarbon gases containing more than one carbon atom. This was not to be expected from prior experience which indicated that if the iron group metal content of the catalyst is reduced to a value at which carbon formation will not occur conversion will drop far below economic levels, i. e. to about 30% or lower. It will be appreciated that 100% hydrocarbon conversion may be readily approached or attained by means of a suitable product gas recycle or multi stage operation in a manner well understood by those skilled in the art. The invention provides, therefore, a technically practical means for converting hydrocarbon gases with $CO_2$ completely into $H_2$ and CO without the usual difficulties resulting from excessive carbon formation.

In accordance with a preferred embodiment of the invention, hydrocarbon gases, such as methane, natural gas, refinery gases, etc. and particularly such gases as contain substantial proportions of ethane, propane, ethylene and/or propylene, are mixed with an oxidizing gas rich in $CO_2$ and are first contacted at suitable conversion conditions with magnesia alone for a time sufficient to convert the constituents having the strongest cracking tendency into $H_2$ and CO without carbon formation. Thereafter the gas mixture so obtained is contacted with a conventional reformation catalyst of the type described above containing an iron group metal, such as nickel, in proportions within the range of about 8-30% and adequate to afford high conversion activity. The catalyst in this second stage may also be arranged in layers of increasing nickel concentration in the direction of flow of the reactants so as to accomplish a gradual increase in catalyst activity as the cracking tendency of the feed stock decreases as the result of the progressive conversion of feed constituents having a strong cracking tendency.

The conversion conditions suitable for the purposes of the present invention are generally similar to those conventional for the catalytic reformation of hydrocarbon gases with $CO_2$ or mixtures of $CO_2$ with steam. It has been found, however, that best results are obtained when slightly higher than conventional temperatures are maintained on the magnesia catalyst of the invention. Thus, for methane conversion, temperatures of about 1600°-1800° F., particularly about 1700° F., are preferred, while temperatures of about 1400°-1600° F. are sufficient for the conversion of more reactive feed stocks, such as olefins or saturated hydrocarbon gases containing more than one carbon atom per molecule. When subsequent layers of conventional high activity catalyst are used they may be kept at the usual temperatures varying from about 1200°-1600° F.

Having set forth its objects and general nature, the invention will be best understood from the following more detailed description and specific examples read with reference to the accompanying drawing.

Referring now in detail to the drawing, reference numeral 1 indicates the gas line supplying natural or refinery gas from any suitable sources not shown.

A furnace adapted to be fired with oil or gas is shown at 5. Feed gas and a $CO_2$-containing oxidizing gas enter through lines 1 and 2, respectively, if desired after preheating. The oxidizing gas may contain, for example, 1.5-2 mols of $CO_2$ and 0.5-0.7 mols of steam per mol of $CH_4$ supplied to produce a gas mixture having an $H_2$:CO ratio of about 1. The gases are passed through line 3 to a manifold 4 from which the mixture is distributed among reaction tubes 6 of which only three are shown connected in parallel and mounted in furnace 5. These tubes are filled with catalyst layers N, O and P which will be described more fully below. The tubes are connected to the manifold 4 through separate lines fitted with valves 10a, 10b and 10c and the gas discharged from the tubes is collected in a manifold 16. Hydrocarbon gas throughputs of about 100–600 v/v/hr. may be used.

Gases from manifold 16 may be conducted by pipe 18 to a further reaction zone which comprises a catalyst drum 19. Steam may be added to manifold 16 by means of pipe 20 and gases discharged from this secondary reaction pass by line 21 into cooler 22. Cooled gas passes therefrom into a separator 23, from which water is withdrawn through line 24 and gas through line 25.

The operation of the process as described to this point is conventional. Natural gas or refinery gases comprising hydrocarbons of a paraffin and olefin series may be converted by means of $CO_2$ and steam to produce carbon monoxide or carbon dioxide and hydrogen. It is desirable to remove at least the major quantity of sulphur from the feed, in the form of hydrogen sulfide or mercaptan by means of a caustic wash or otherwise. The reformation reaction occurs in tubes 8 at a temperature above about 1000° F., normally in the presence of catalyst comprising nickel with or without other elements or compounds, such as alumina, magnesia, siliceous materials such as kaoline and the like. This reaction results in the formation of hydrogen, carbon monoxide and, some carbon dioxide. If it is desired to recover a gas of this composition, vessel 19 may have the form and function of a waste-heat boiler or may be completely omitted.

The reaction mixture may also be passed from the first stage into the second stage 19 operating as a catalyst converter at a much lower temperature, for example about 800° F. and steam may be added through line 20 and, if desired, through manifold 28 to the gasses and/or to various catalyst zones within reactor 19. In this step, carbon monoxide produced in the first stage is converted into carbon dioxide and additional hydrogen. The second reaction may be catalyzed by a number of suitable materials, of which iron oxide is perhaps the most advantageous. The gas mixture is then suitably cooled and carbon dioxide can be removed in any conventional manner to produce a gas consisting essentially of hydrogen with small amounts of unconverted methane which is usually not over 1 or 2%.

As stated above, the catalyst mass in tubes 8 consists of several layers N, O and P, the activity of which increases from the top to the bottom of tubes 8 as the result of an increased active metal content. In accordance with the present invention layer N consists exclusively of magnesia. Typical catalyst analyses of layers O and P are as follows:

Layers O:                                Per cent by weight
    NiO _____ 10
    $Al_2O_3$ _____ 7
    MgO _____ 3
    Aluminum Cement _____ 80
Layers P:
    NiO _____ 25.0
    MgO _____ 14.0
    Aluminum Cement _____ 28.0
    Kaoline _____ 33.0

Catalyst layer N is preferably maintained at a temperature of about 1400°–1600° F., and catalyst layers O and P at about 1100°–1400° F. This may be readily accomplished by a proper control of the flow of heating gases within furnace 8 with the aid of suitable baffles as will be understood by those skilled in the art.

When operating in this manner, by far the major proportion of constituents, such as paraffins and olefins having 2 or 3 carbon atoms per molecule, and appreciable amounts of methane will be substantially completely converted into CO and $H_2$ without any significant carbon formation by the time the reaction mixtures reach catalyst layers O and P where the remainder of the hydrocarbon feed is converted in the substantial absence of readily coking constituents.

The favorable results which may be obtained when operating in accordance with the present invention are substantiated by the experimental data given in the following example.

Example

Three different catalysts were used in the reformation of methane with $CO_2$ at a temperature of about 1700° F. and a methane throughput of about 100 v/v/hr. The catalysts and feed gas compositions used and the results obtained in these experiments are tabulated below.

| Reformer Catalyst | MgO | 75 MgO+25 NiO | Fe |
|---|---|---|---|
| Feed Composition, Per Cent: | | | |
| $CH_4$ | 45 | 52 | 45 |
| $CO_2$ | 55 | 48 | 55 |
| Reacted, Per Cent: | | | |
| $CH_4$ | 63 | 99 | 99 |
| $CO_2$ | 65 | 80 | 54 |
| Selectivity, Per Cent: | | | |
| CO | 100 | 83 | 81 |
| C | 0 | 17 | 19 |

The above data demonstrate that the methane converted in the presence of the magnesia catalyst of the present invention is converted 100% to $H_2$ and CO without the formation of carbon, while when using a conventional iron catalyst under the same conditions and a conventional $MgO \cdot NiO_2$ reformer catalyst with a feed stock containing a slightly lower ratio of carbon dioxide to methane but otherwise under the same conditions almost 20% of the feed is lost in the form of carbon.

The foregoing description and exemplary operations have served to illustrate specific applications and results of the invention but are not intended to be limiting in scope. Other modifications may appear to those skilled in the art without departing from the spirit of the invention.

What is claimed is:

1. In the process of producing gas mixtures containing $H_2$ and CO in a ratio below 3:1 by converting a hydrocarbon gas with an oxidizing gas containing a major proportion of $CO_2$, the improvement which comprises contacting a mixture of said hydrocarbon gas and said oxidizing gas at a conversion temperature of about 1400°–1800° F. with a catalyst consisting of magnesia.

2. The process of claim 1 in which said hydrocarbon gas contains hydrocarbons having more than one carbon atom per molecule.

3. The process of claim 1 in which said oxidizing gas contains a minor proportion of steam.

4. The process of claim 1 in which said hydrocarbon gas consists essentially of methane and said temperature is about 1600°–1800° F.

5. The process of claim 1 in which said hydrocarbon gas contains substantial proportions of hydrocarbons having more than one carbon atom per molecule and said temperature is about 1400°–1600° F.

6. The process of claim 1 in which said hydrocarbon gas comprises at least one gas selected from the group consisting of methane, ethane, propane, ethylene, and propylene.

7. The process of claim 6 in which said hydrocarbon gas comprises methane.

8. The process of producing gas mixtures containing $H_2$ and CO in a ratio below 3:1 from a hydrocarbon gas which comprises passing a mixture of said hydrocarbon gas with an oxidizing gas containing a major proportion of $CO_2$ first over a catalyst consisting of magnesia at a conversion temperature of about 1400°–1800° F. conducive to the conversion of a substantial portion of said hydrocarbon gas into $H_2$ and CO and thereafter over a second catalyst comprising an iron group metal at a temperature of about 1200°–1500° F. conducive to the conversion of unconverted hydrocarbon gas into $H_2$ and CO.

9. The process of claim 8 in which said oxidizing gas contains a minor proportion of steam.

10. The process of claim 8 in which said hydrocarbon gas comprises at least one member of the group consisting of ethane, propane, ethylene and propylene.

11. The process of claim 8 in which said hydrocarbon gas consists essentially of methane.

CHARLES S. LYNCH.

REFERENCES CITED

The following references are of record in the file of this patent:

UNITED STATES PATENTS

| Number | Name | Date |
|---|---|---|
| 2,030,283 | DeRewal | Feb. 11, 1936 |
| 2,056,911 | Schiller et al. | Oct. 6, 1936 |

FOREIGN PATENTS

| Number | Country | Date |
|---|---|---|
| 390,849 | Great Britain | Apr. 5, 1933 |

OTHER REFERENCES

"Synthetic Petroleum from the Synthine Process," by Weil and Lane (1948), page 30.